United States Patent [19]
Chamberlin et al.

[11] Patent Number: 5,622,260
[45] Date of Patent: Apr. 22, 1997

[54] SUPPORT FOR TAPE PANCAKES

[75] Inventors: Davis W. Chamberlin; Gerald J. Niles, both of St. Paul, Minn.

[73] Assignee: Minnesota Mining and Manufacturing Company, St. Paul, Minn.

[21] Appl. No.: 52,129

[22] Filed: Apr. 22, 1993

Related U.S. Application Data

[63] Continuation-in-part of Ser. No. 915,119, Jul. 17, 1992, Pat. No. 5,284,246.

[51] Int. Cl.$^6$ ................................................. B65D 85/62
[52] U.S. Cl. ........................ 206/394; 206/395; 206/303
[58] Field of Search ................................. 206/394, 391, 206/395, 303, 397

[56] References Cited

U.S. PATENT DOCUMENTS

| | | | |
|---|---|---|---|
| 4,124,173 | 11/1978 | Damour | 242/72 B |
| 4,516,786 | 5/1985 | Lund | 279/2 R |
| 4,708,246 | 11/1987 | Minion | 206/394 |
| 4,730,779 | 3/1988 | Thievessen | 242/72 R |
| 4,883,178 | 11/1989 | Thiele et al. | 206/391 |
| 4,955,471 | 9/1990 | Hirose et al. | 206/303 |
| 5,094,346 | 3/1992 | Sommerfeldt et al. | 206/394 |
| 5,205,412 | 4/1993 | Krieg | 206/394 |

FOREIGN PATENT DOCUMENTS

| | | | |
|---|---|---|---|
| 0064166B1 | 3/1986 | European Pat. Off. | |
| 2-296689 | 12/1990 | Japan | 206/394 |
| 1121765 | 7/1968 | United Kingdom | 206/397 |
| 2160509 | 12/1985 | United Kingdom | 206/303 |

*Primary Examiner*—Paul T. Sewell
*Attorney, Agent, or Firm*—Gary L. Griswold; Walter N. Kirn; Charles D. Levine

[57] ABSTRACT

A system for securing a plurality of tape pancakes includes a compressible core support on which the pancakes can be mounted. An interior rod having a head fits and is received within the core support. A nub on the inside surface of the core support engages a groove on the outside surface of the interior rod to provide a threaded engagement between the interior rod and the core support. Rotation of the interior rod within the core support after the head contacts the end of the core support provides an axial compression load onto the core support to hold together the pancakes. This axial compression also expands the baffles which contact and tighten against the inside of the tape pancake cores and provide a radial force to secure the pancakes in place.

13 Claims, 9 Drawing Sheets

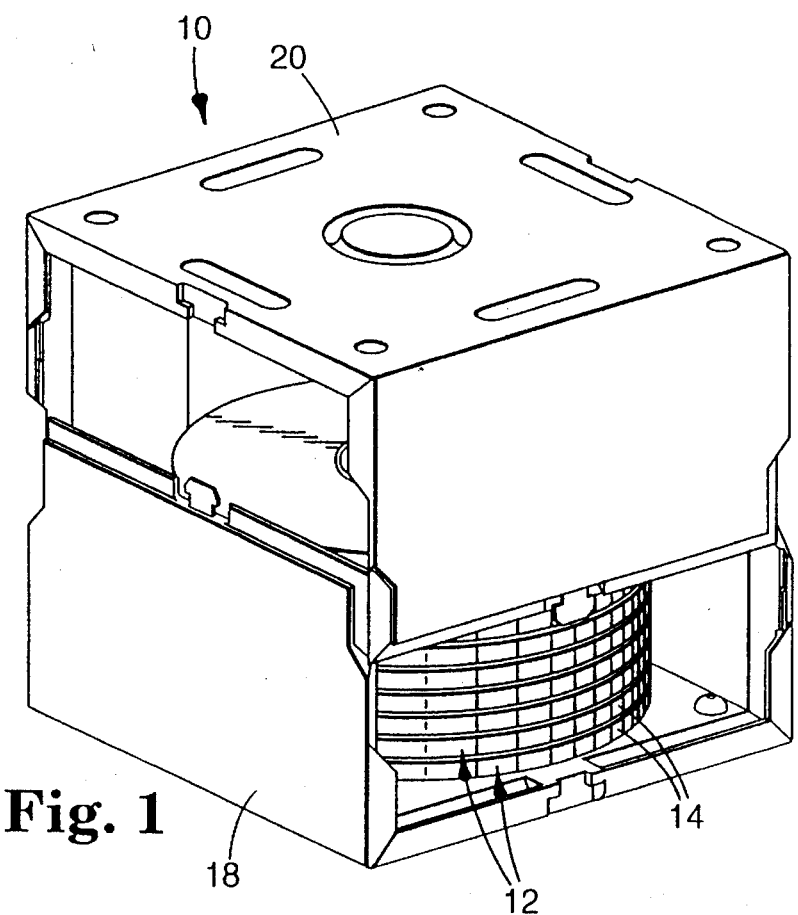
Fig. 1
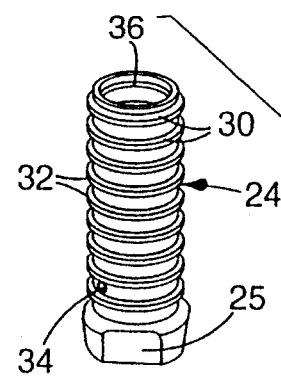
Fig. 3
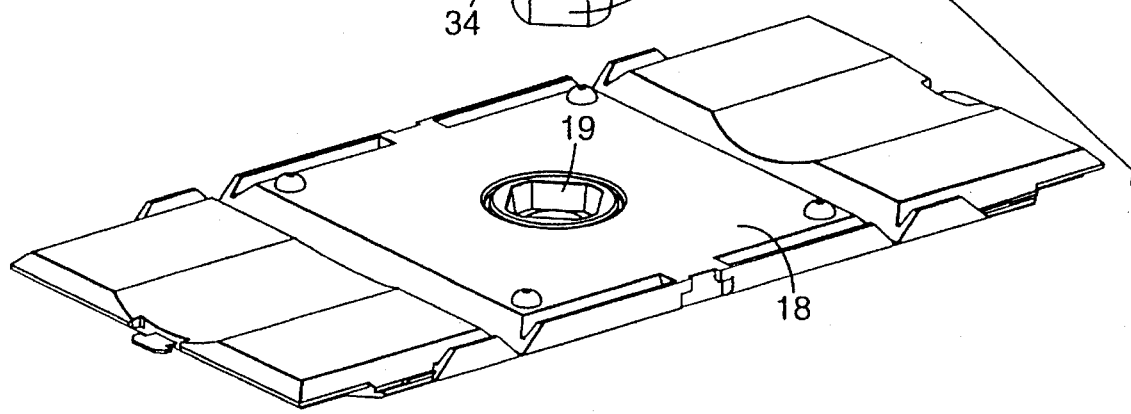

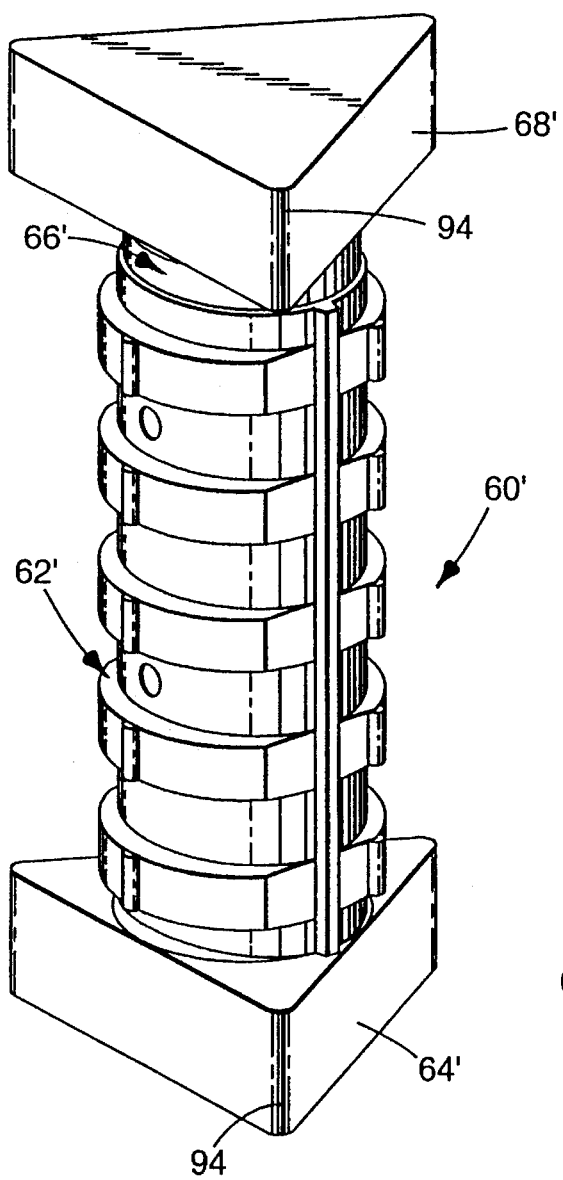
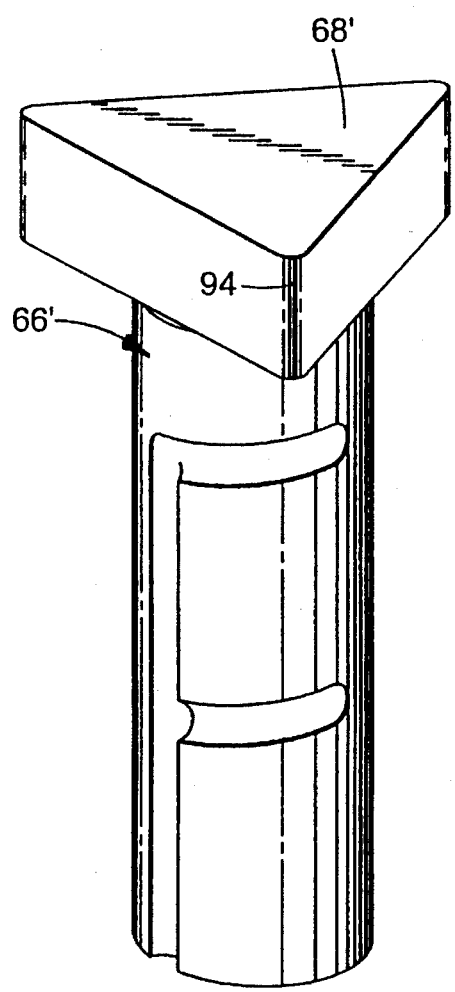
Fig. 13
Fig. 14

SUPPORT FOR TAPE PANCAKES

This is a continuation-in-part application of U.S. Ser. No. 07/915,119, filed Jul. 17, 1992, now U.S. Pat. No. 5,284,246.

TECHNICAL FIELD

The present invention relates to storage and shipping containers. More particularly, the present invention relates to mandrels for tape pancakes which are used in storage and shipping containers.

BACKGROUND OF THE INVENTION

In producing magnetic recording media, there is a recurring need to transport large quantities of recording tape from the point of tape manufacture to other locations for final loading into cassettes, cartridges, or other carriers. It is common to transport the tape in the form of relatively large rolls, called pancakes. A pancake of 1.27 cm (0.5 in) wide tape is typically wound on a hollow annular core having an outer diameter of 11.4 cm (4.5 in), and a width of 1.8 cm (0.7 in), slightly larger than the width of the tape. The outer diameter of the pancakes is typically about 35.6–40.7 cm (14–16 in). Shipping these tape pancakes over long distances under conditions of mechanical shock and vibration requires that they be well supported.

One primary form of damage to pancakes is axial shifting of the layers of tape relative to the pancake such that the pancake is no longer flat. This shifting, called core drop, hub drop, popped strands, or tape shift, can be caused by a stack of pancakes being dropped on a hard floor or being transported over rough or bumpy surfaces. Other problems and damage caused with known pancake containers include the offsetting of a portion of the pancake, called "upset," rotation of the core relative to the pancake, and transfer of cushion adhesive to the tape.

While effective protection of the tape in the pancake stacks is essential, the magnetic tape market is very price-competitive. Thus, protective packaging must be low cost, both in the packaging material itself, and in the labor required to apply and remove the packaging. It is also desirable to minimize the amount of packaging waste material which is discarded.

Known methods of protecting pancakes during shipping generally involve sliding several pancakes over a shaft or hollow tube, placing resilient spacers between each pancake, and placing a solid end plate on the top and bottom of the stack. The stack can be held together by shrink wrap film, as disclosed in U.S. Pat. No. 4,955,471.

U.S. Pat. No. 4,883,178 eliminates shrink wrap and discloses holding a pancake stack together with a threaded member running coaxially along the center of the stack, and a nut which tightens on an end plate. The compression is created by the threaded member being disposed within the pancake cores.

U.S. Pat. No. 4,708,246 discloses spacers and other packaging features which improve compression control. However, sometimes spacers move during shipping and can generate debris. Also, some spacer materials can create static which attracts debris to the pancakes.

Radially expanding mandrels are also known. U.S. Pat. No. 4,124,173 discloses an inflatable tube inside of an expandable mandrel. Cam mechanisms which press cylinder segments outwardly when a central shaft rotates relative to the outer segments are also known. U.S. Pat. No. 4,516,786 discloses a rotatable core chuck and U.S. Pat. No. 4,730,779 discloses an expanding assembly for a web-coiling core.

U.S. Pat. No. 5,094,346 assigned to Minnesota Mining and Manufacturing Company stacks pancakes on a mandrel within a container. The mandrel could radially expand to secure the pancakes and/or the pancakes could be secured by axial pressure.

SUMMARY OF THE INVENTION

A system for securing a plurality of disk-shaped articles having a central opening such as tape pancakes includes a core support on which the articles can be mounted and a container. The core support includes a head having an outer diameter greater than the outer diameter of the core support. An interior rod is received within the core support. The interior rod includes a head having an outer diameter greater than the outer diameter of the interior rod.

The core support is compressed to provide an axial compression load on the articles between the core support head and the interior rod head and to radially expand to provide a radial load on the articles. This is accomplished by threadedly and rotationally engaging the interior rod within the core support such that rotation of the interior rod within the core support moves the interior rod toward the articles. Four nubs are formed on the inside surface of the core support. Two nubs are formed in two axial lines with the nubs on opposing sides of the core support spaced different distances from the head and offset from each other. Two corresponding axial grooves are formed on the outside surface of the interior rod. Each axial groove includes two circumferential grooves which are angled toward the interior rod head. As the interior rod is slid inside the core support, the nubs slide within their respective axial and circumferential grooves to provide a threaded engagement between the interior rod and the core support. This moves the head of the interior rod toward the articles and provides an axial compression load onto the core support and the articles to secure the articles.

The perimeters of both the interior rod and the core support are cam-shaped such that when the interior rod is rotated within the core support the interior rod and core support act as opposing cams with the interior rod radially expanding the core support. This causes the core support to tighten against the inside of the articles and to provide a radial expansion force on the articles to secure the articles.

The container can include a receptacle which receives the core support. One support head fits within the receptacle to prevent rotation of the support after the container is closed. The head includes four projections equiangularly distributed around the circumference of the head. The four projections include two opposing large projections which extend for the entire length of the head and two opposing small projections which extend for a short portion of the head length. The receptacle includes complementary slots which receive the large projections and complementary cavities adjacent the base of the receptacle which receive the small projections. The receptacle also includes a ramped recess portion which leads into each cavity, wherein when the projections are received in their respective slots and cavities, the support is secured within the container.

BRIEF DESCRIPTION OF THE DRAWINGS

FIG. 1 is a perspective view of a container having the support of the present invention.

FIG. 3 is a perspective view of the baffled core support of FIG. 2 with a container base.

FIG. 4 is a perspective view of the interior rod of. FIG. 2 with a container base loaded with tape pancakes.

FIG. 13 is a perspective view of a support according to another embodiment of the present invention.

FIG. 14 is a perspective view of the interior rod of FIG. 13.

DETAILED DESCRIPTION OF PREFERRED EMBODIMENT

Figure 2:
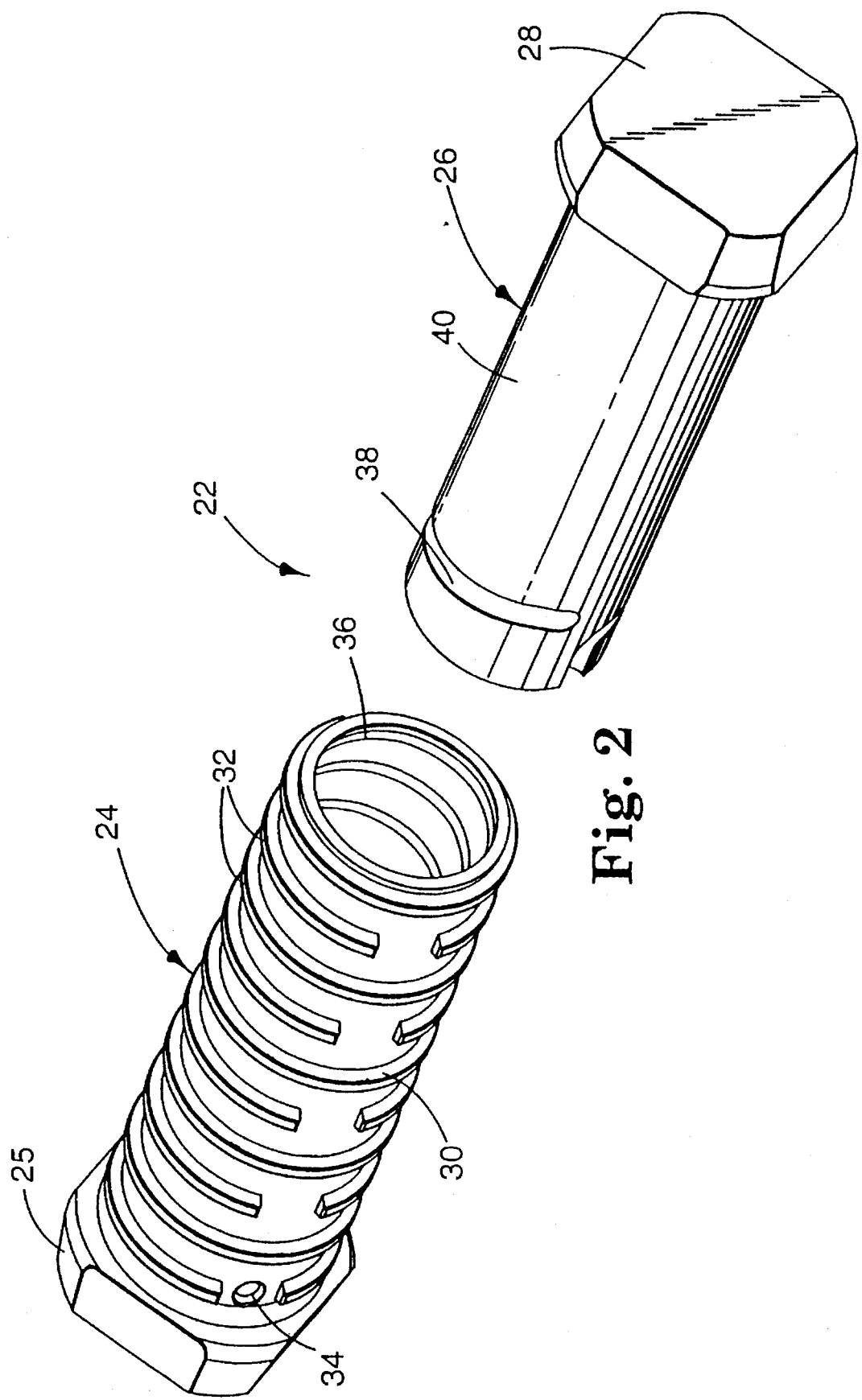
FIG. 2 is a perspective view of a support according to the present invention before assembly.

FIGS. 1–5 illustrate a container 10 used for pancakes 12 of recording tape, each of which includes a quantity of tape 14 wound around a flangeless hub or core 16 which extends approximately 0.25 cm (0.1 in) on each side of the tape 14. The container 10 includes a base 18, a cover 20 which combines with the base 18 to enclose the pancakes 12, and a support 22 extending from the base 18 on which a plurality of pancakes 12 can be placed.

A thin spacer can be disposed between adjacent pancakes 12 on each support 22 to prevent the adjacent cores from contacting each other and to prevent "hub dusting" which creates debris. End pads or bushings can be placed on the walls of the base 18 to space the pancakes 12 from the wall, maintain constant axial pressure on the pancakes 12, and prevent damage to the adjacent pancake due to contact with the wall if the wall bows and contacts the pancake 12 nonuniformly. The peripheral edges of the pancakes 12 are completely exposed to allow them to be grasped symmetrically to reduce the effort needed to remove the pancakes 12 from the support 22. This reduces the risk of damage to the pancakes 12 and injury to workers.

The support 22, shown in FIG. 2, is part of a system which secures a plurality of disk-shaped articles having a central opening, such as tape pancakes. The support 22 can be made of material having a suitable strength-to-weight ratio such as any strong, lightweight thermoplastic material such as high density polyethylene or rigid polyvinyl chloride without high lubricity to enable frictional locking of the pancakes.

Figure 4:
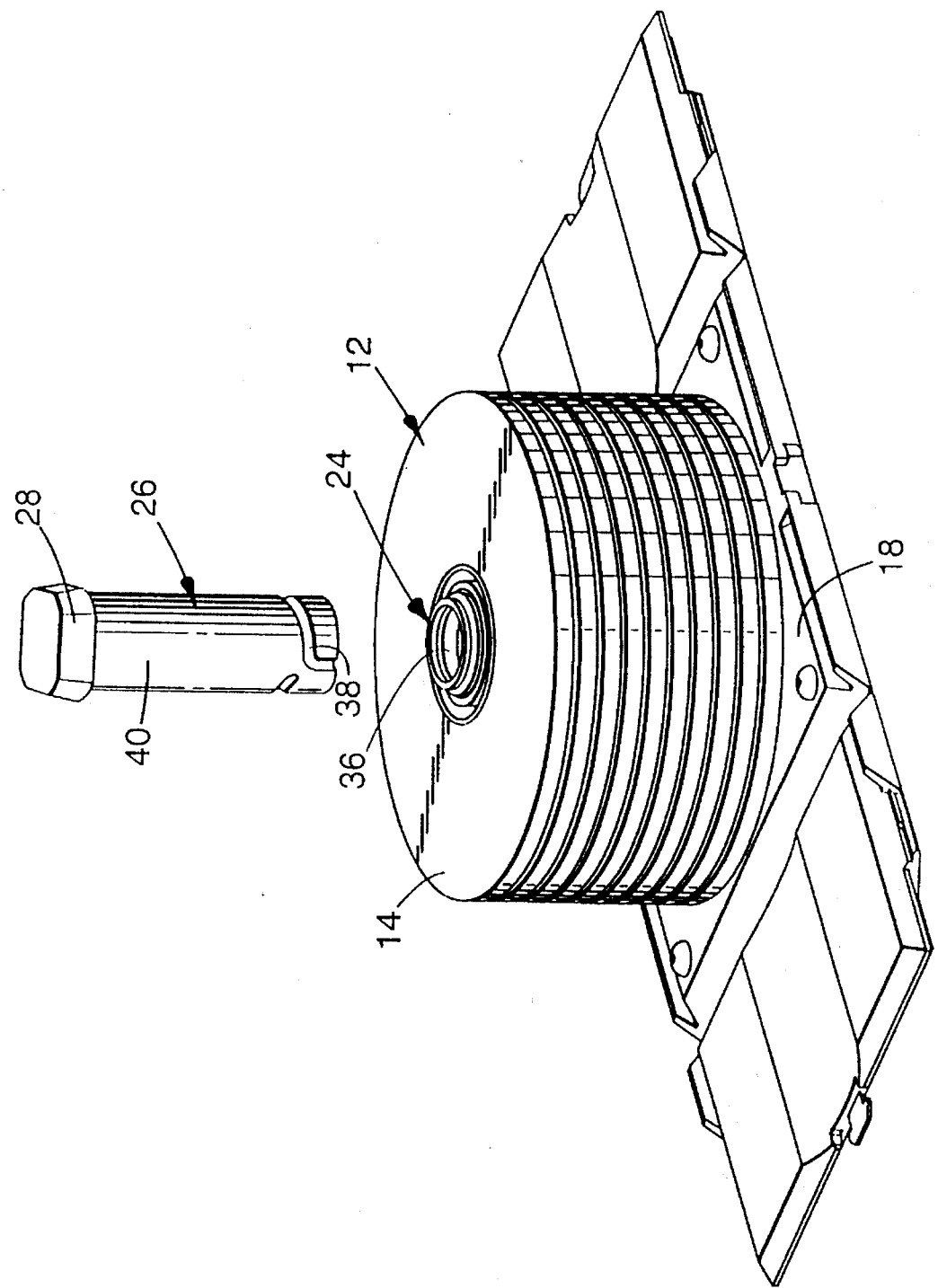
Figure 5:
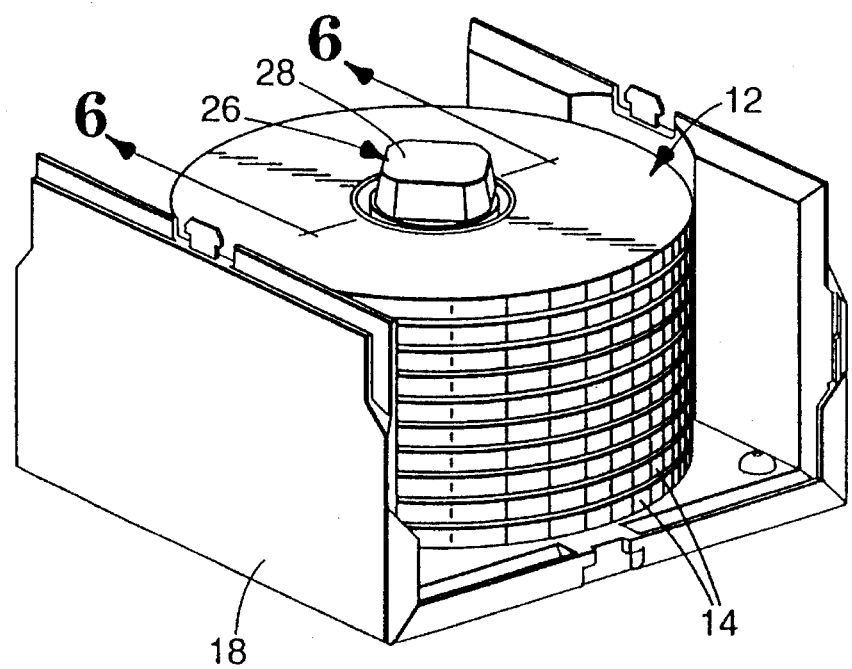
FIG. 5 is a perspective view of the support of FIG. 2 mounted in a container base loaded with tape pancakes.
Figure 6:
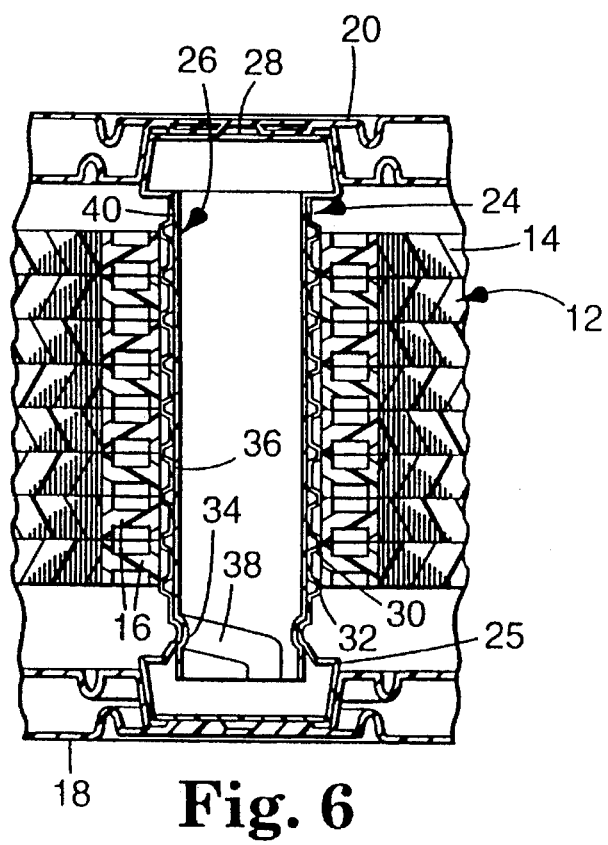
FIG. 6 is a cross-sectional view of the support taken along line 6—6 of FIG. 5.

The support 22 is a spindle or mandrel and can be isolated vibrationally from the container sections. The support can move independently of the remainder of the container 10 to absorb shocks and protect the stored pancakes. Referring to FIGS. 3, 4, and 6, the support 22 is formed of two primary components, a baffled core support 24 with a free end and a head 25 at the other end and an interior rod 26 with a free end and a head 28 at the other end. The heads 25, 28 fit within respective receptacles 19 in the base 18 and the cover 20. The noncircular shape of the heads 25, 28 fit within the receptacles 19 and prevent rotation of the support 22 after the container 10 is assembled. The interior rod 26 fits within the core support 24. These two components can be formed by blow molding a single spindle and cutting the spindle to form the core support 24 and interior rod 26. The baffles 30 can be ribs with some of the baffles extending completely around the core support 24. Alternatively, as shown in FIG. 2, the ribs can be broken. Either some of the ribs can be broken or all can be broken. In the embodiment of FIG. 2, all are broken with the broken portion alternating in circumferential location. The baffle 30 dimensions are selected to permit two pancakes 12 to share a baffle peak 32 when the pancakes are mounted on the core support 24. Thus, each baffle peak 32 will support two adjacent pancake halves.

A nub 34 on the inside surface 36 of the core support 24 engages a spiral groove 38 on the outside surface 40 of the interior rod 26 to provide a threaded engagement between the interior rod 26 and the core support 24. The interior rod 26 can be hand turned and tightened without tools. Other modifications of a threaded engagement between the core support 24 and the interior rod 26 also could be used. For example, two nub 34 and groove 38 pairs could be used.

Rotation of the interior rod 26 within the core support 24 after the nub 34 engages the groove 38, moves the head 28 of the interior rod 26 toward the pancake stack. Further rotation after the head 28 of the interior rod 26 contacts the end of the core support 24 provides an axial compression load onto the core support 24 and therefore onto the pancake cores to hold together the pancakes 12. This axial compression expands the baffles 30. As the baffles 30 expand they contact and tighten against the inside of the tape pancake cores 16 and provide a radial force to secure the pancakes 12 in place.

As shown in FIG. 6, the interior rod head 28 compresses the pancakes on the support 22 by applying a load on substantially only the pancake cores 16. By eliminating pressure on the tape 14 itself, there is no pressure on the tape to force the tape off of the core 16 and cause core drop. The load can be applied to substantially only the outer race of the cores 16 to avoid tipping the pancake 12 on the support 22 due to the lack of contact surface area caused by the clearance between the pancake core and the mandrel. This can be accomplished by forming the inner race of the core 16 of a smaller axial length than the outer race. Alternatively, this can be accomplished by forming the portion of the interior rod head 28 that is disposed adjacent the inner race of the core 16 of a smaller axial length than the radially outer portions of the head that is disposed adjacent and against the outer race of the core.

This system for applying a compression load on pancakes 12 stored on a support 22 can be used in other systems in which one or more objects having a through opening are stored on a mandrel or spindle and the objects are held in place using axial and/or radial compression. Neither the objects nor the mandrel need be cylindrical.

Figure 7:
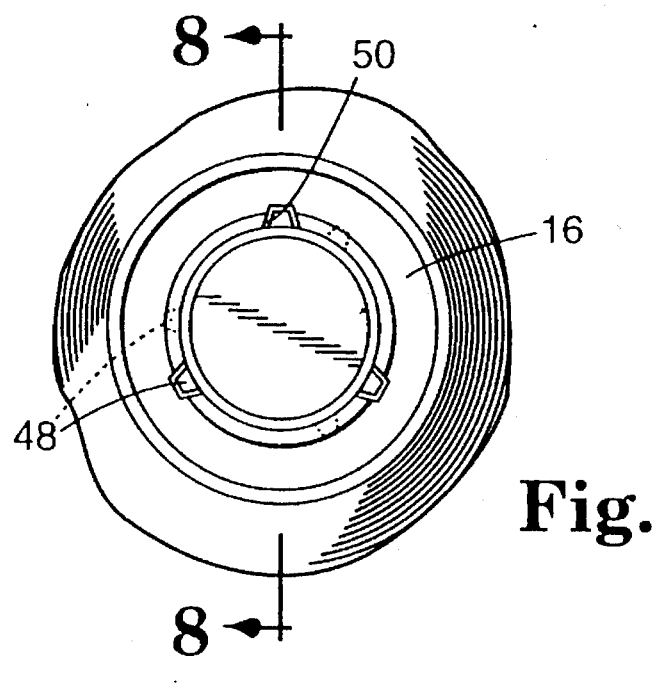
FIG. 7 is an end view of the support according to another embodiment of the present invention.
Figure 8:
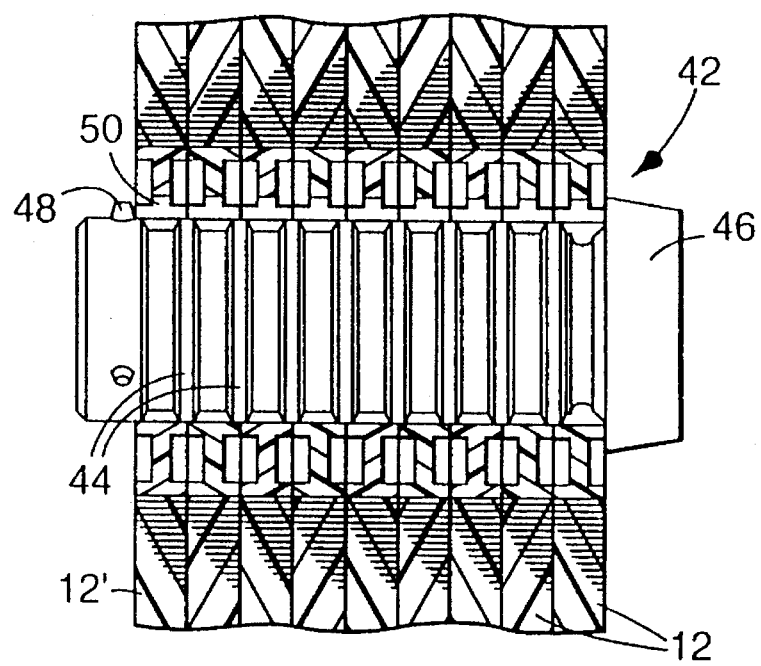
FIG. 8 is a cross-sectional view of a support taken along line 8—8 of FIG. 7.

In an alternative embodiment shown in FIGS. 7 and 8, the support can be an integral one piece support which expands axially to permit locking of the objects on the support. The support 42 includes a baffled core support 44 and a head 46 and can act analogously to an extension spring. The support 42 can be axially expanded and is biased in an axially contracted relaxed or "as molded" state. The core support 44 has three spaced nubs 48 located toward the free end opposite the head. The nubs 48 are sized and spaced at locations corresponding to the channels 50 on a typical pancake core 16 to permit the channels 50 to pass over the nubs 48.

The loading of pancakes 12 onto the support is as follows. In the relaxed state, the length of the core support 44 is less than the length of the stacked pancakes 12 to be stored on the support 42. The core channels 50 are aligned with the nubs 48 and the pancakes 12 are passed over the core support 44 to the head 46. After the last pancake 12 is in place, the core support 44 is stretched to its expanded length which is longer than the stacked pancakes 12 by a distance sufficient to allow the last pancake "12" to be rotated. The last pancake 12' is then rotated so that the nubs 48 do not align with the channels 50. The location of the channels 50 after rotation is shown in broken line in FIG. 7 and the last pancake is shown in FIG. 8 being past the nubs 48. After rotation, the expansion force is removed from the core support 44 and the core support attempts to return to its relaxed state, thereby clamping the pancakes 12. Unclamping is accomplished by reversing the procedure. The expansion force can be provided either with a mechanical fixture or by pneumatic pressure when the support 42 is blow molded.

Figure 9:
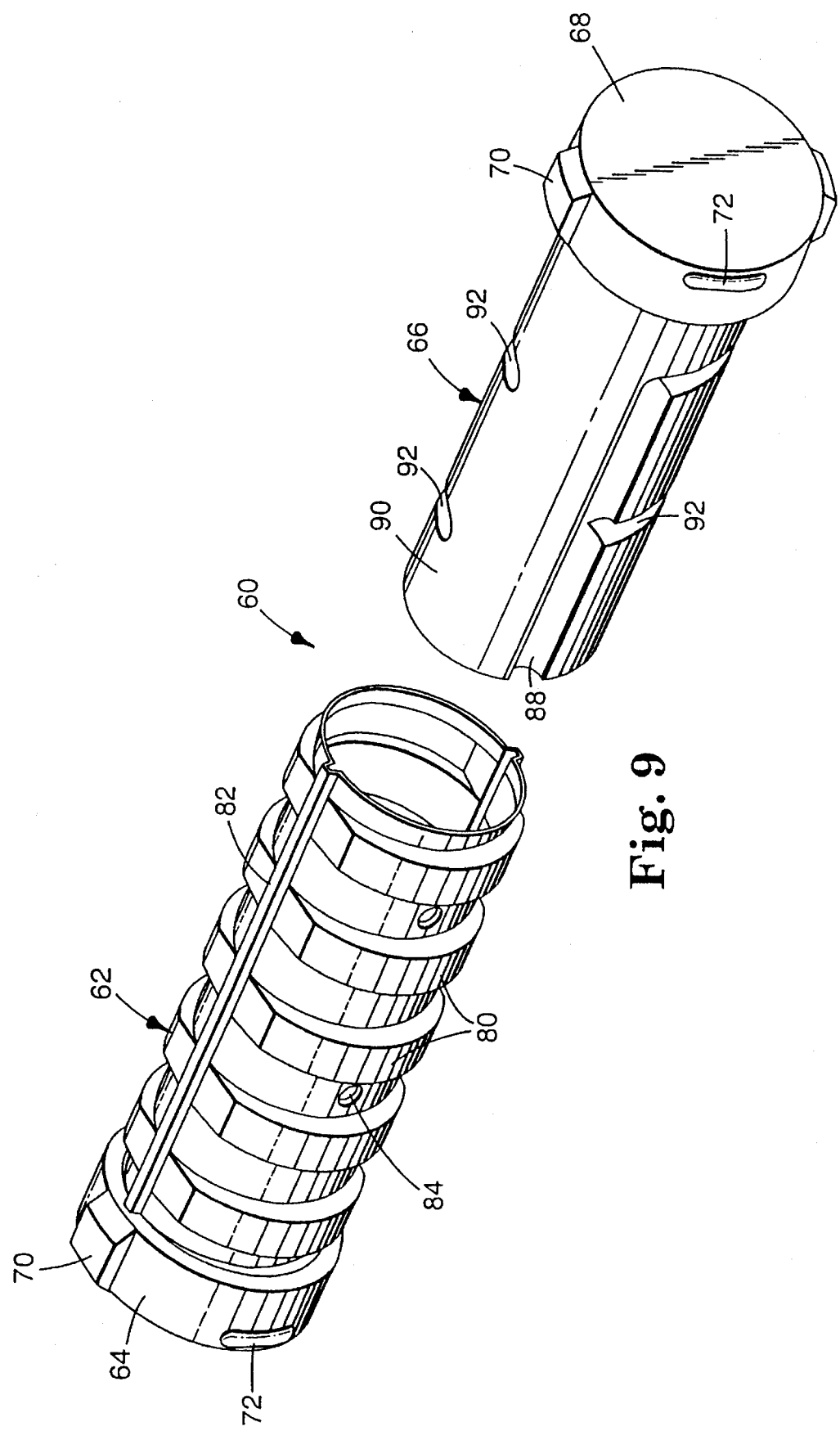
FIG. 9 is a perspective view of a support according to another embodiment of the present invention before assembly.
Figure 10:
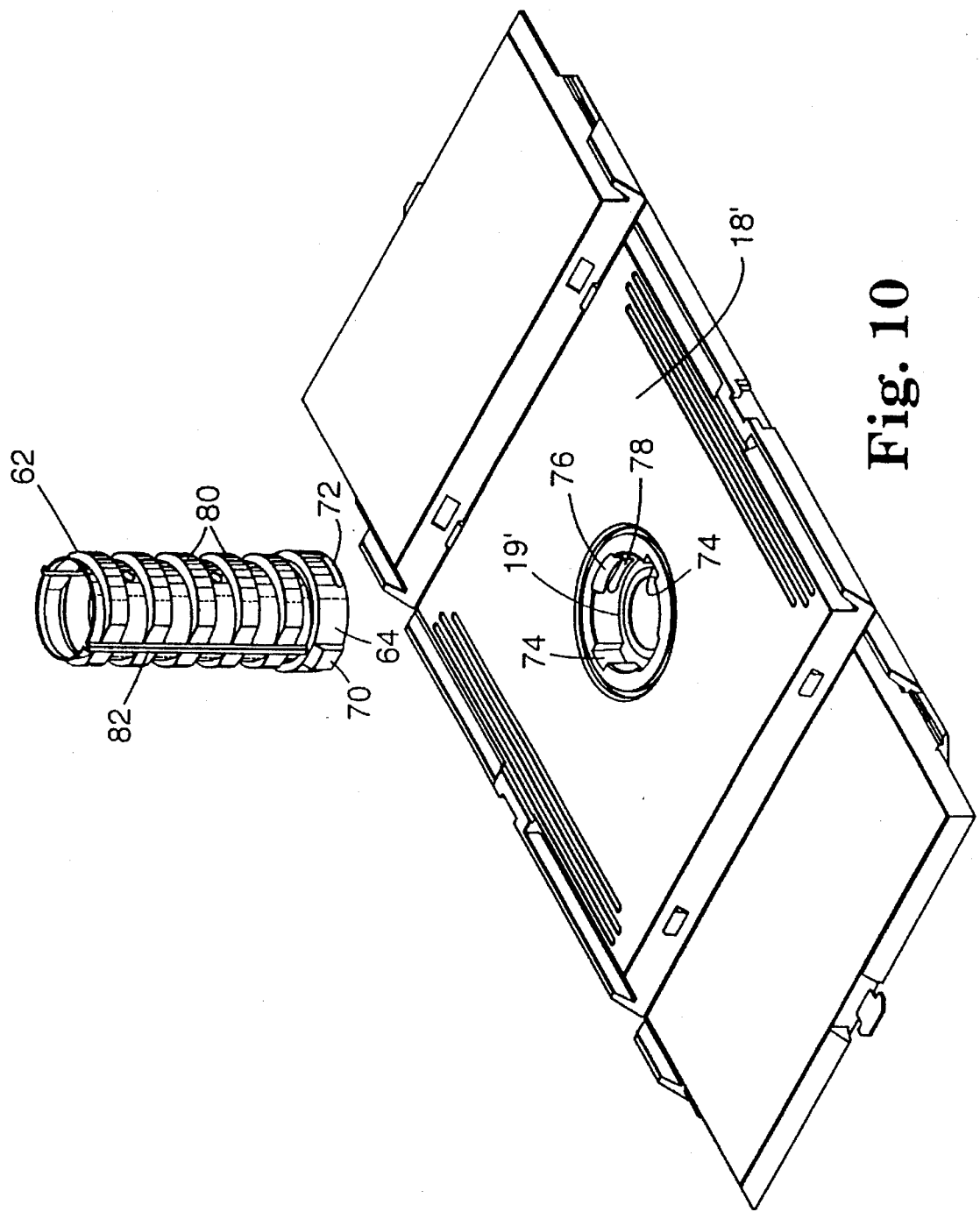
FIG. 10 is a perspective view of the core support of FIG. 9 with a container base.

FIGS. 9 and 10 show an additional embodiment of the support. The support 60 includes a core support 62 with a free end and a head 64 at the other end and an interior rod 66 with a free end and a head 68 at the other end. The heads 64, 68 fit within respective receptacles 19' in the base 18' and the cover 20'. The noncircular shape of the heads 64, 68 fit within the receptacles 19' and prevent rotation of the support 60 after the container 10' is assembled or closed. The heads 64, 68 include four projections equiangularly distributed around the circumference. Two opposing large projections 70 extend for the entire length of each head 64, 68 and the other two opposing small projections 72 extend for a short portion of each head length.

The large projections 70 are received in complementary slots 74 in the receptacle 19' in the base 18' and cover 20' of the container 10'. The small projections 72 slide over a ramped recess portion 76 in the receptacle 19' and are received in a cavity 78 adjacent the base of the receptacle 19'. When the projections 70, 72 are received in their respective slots 74 and cavities 78, the support 60 is secured within the container 10' and will not inadvertently be removed during loading of pancakes 12 or other objects. Also, this configuration prevents the inner wall of the dual wall container 10' from bowing outwardly when loads are placed on the support 60 such as by stored pancakes 12 or other objects.

The interior rod 66 fits within the core support 62. The core support 62 includes raised portions 80 which extend completely around the core support 62 but are flattened in the area corresponding to the circumferential location of the large projections 70 on the heads 64, 68. The dimensions of the raised portions 80 are selected to permit two pancakes 12 to share a raised portion 80 when the pancakes 12 are mounted on the core support 62. Thus, each raised portion 80 will support two adjacent pancake halves.

An elongate retainer 82 extends for the length of the core support 62 and is sized to correspond to the channels 50 on a typical pancake core 16 to permit the channels 50 to pass over the retainer 82. The retainer 82 helps prevent rotation of the cores 16 on the support 60.

A pair of nubs 84 are formed on the inside surface 66 of the core support 62 in an axial line corresponding to the center of each small projection 72. There are four nubs 84. The nubs 84 on opposing sides of the core support 62 are not spaced the same distance from the head 64. They are offset from each other. Alternatively, they need not be 180° apart.

Each pair of nubs 84 is received in one of two opposing axial grooves 88 on the outside surface 90 of the interior rod 66. As the interior rod 66 is slid inside the core support 62, the nubs 84 slide within their respective axial grooves 88. Each axial groove 88 has two circumferential grooves 92 which are angled toward the interior rod head. One circumferential groove 92 extends from the end of the axial groove 88 and the other extends from a point in the middle of the axial groove 88. The distance between the circumferential grooves equals the distance between axial nubs 84. After the interior rod 66 is inserted in the core support 62 as far as it can go, limited by the length of the axial grooves 88 which limit nub 84 travel, the interior rod 66 is rotated within the core support 62 with the nubs 84 moving within the circumferential grooves 92 to provide a threaded engagement between the interior rod 66 and the core support 62, to move the head 68 of the interior rod 66 toward the pancake 12 stack, and to compress the support 60 to provide an axial compression load onto the core support 62 and the pancake cores 16 to further secure the pancakes 12 in place. The interior rod 66 can be hand turned and tightened without tools. Other modifications of a threaded engagement between the core support 62 and the interior rod 66 could be used.

Figure 11:
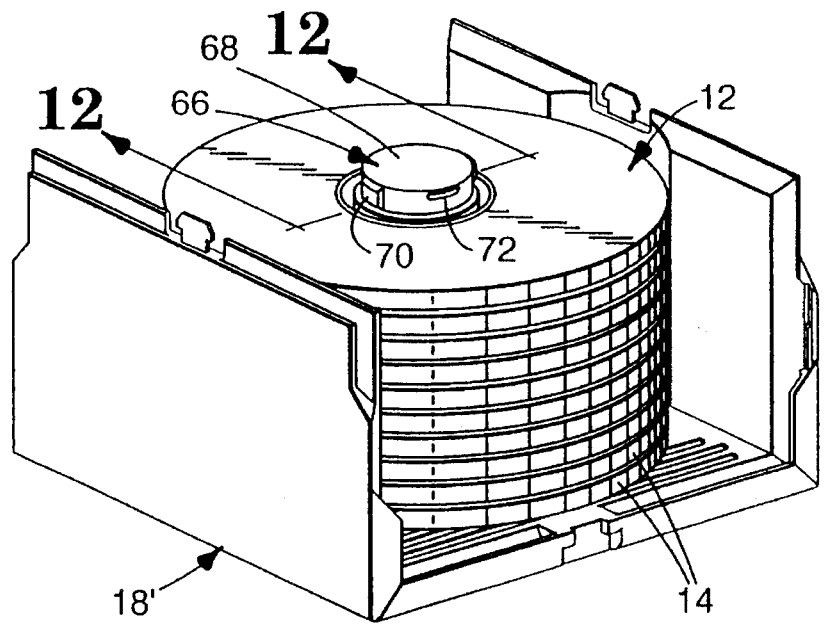
FIG. 11 is a perspective view of the support of FIG. 9 mounted in a container base loaded with tape pancakes.
Figure 12:
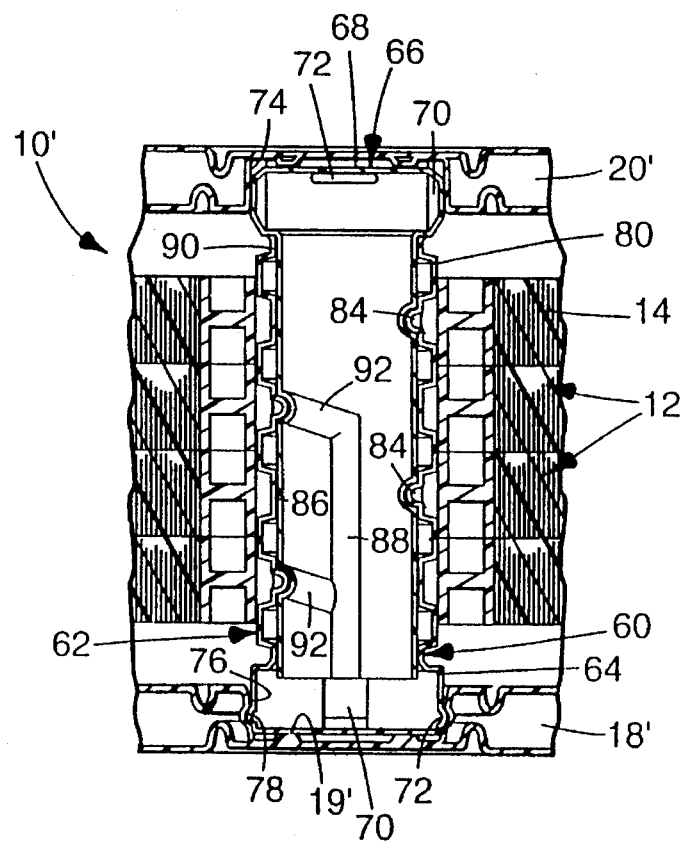
FIG. 12 is a cross-sectional view of the support taken along line 12—12 of FIG. 11.

The perimeters of both the interior rod 66 and the core support 62 are not circular. Both are oval or cam shaped. Thus, when the interior rod 66 is rotated within the core support 62 they act as opposing cams with the interior rod 66 radially expanding the core support 62 to tighten against the inside of the pancake cores 16 and to provide a radial expansion force on the pancakes 12 to further secure the pancakes 12 in place, as shown in FIGS. 11 and 12. This embodiment, like that of FIG. 6, does not apply pressure on the tape itself.

In a modification of the embodiment of FIGS. 9–12, the heads 64' and 68' of the core support 62' and interior rod 66' are triangular, as shown in FIGS. 13 and 14. The pancakes 12 can be placed on the support 60' by sliding them over the heads without separating the core support 62' from the interior rod 66'. The pancakes 12 are slid over the support with the corners 94 of the triangular head aligned with and fitting in corresponding channels 50 on a typical pancake core 16. The entire support 60' is then rotated so the corners 94 of the head are offset from and out of alignment with the channels 50, creating a frictional fit and wedge the cores 16 onto the support 60'. Thus, absent the channels, 50, the heads 64', 68' have a maximum outer diameter which includes at least one corner of the head that is greater than the inner diameter of the pancake cores. Alternatively, the head can have any polygonal shape with a maximum outer diameter which includes at least one corner of the polygon.

In another modification, the pancakes 12 can be axially secured on a support regardless of the configuration of the heads. Each retainer on the support has a break near the end of the support at least as wide as a core 16. The retainer then continues for a short distance at the end of the support around which no further pancakes 12 are mounted. After the last pancake 12 is mounted on the support with the retainers aligned in the channels 50, the pancake is located on the support at the axial location without the retainer. The pancake is rotated so that its channels 50 no longer axially align with the retainers and the retainers on the end of the support hold the pancakes axially, preventing the pancakes from sliding toward the end of the support.

We claim:

1. A system for securing a plurality of disk-shaped articles having a central opening, comprising:

a core support on which the articles can be mounted comprising a head having an outer diameter greater than the outer diameter of the core support;

an interior rod which fits and is received within the core support, wherein the interior rod comprises a head having an outer diameter greater than the outer diameter of the interior rod; and means for compressing the core support to provide an axial compression load on the articles between the core support head and the interior rod head and for radially expanding the core support to provide a radial load on the articles by threadedly and rotationally engaging the interior rod within the core support such that rotation of the interior rod within the core support moves the interior rod toward the articles comprising:

four nubs formed on the inside surface of the core support, wherein two nubs are formed in one axial line and the other two nubs are formed in another axial line, wherein the nubs in each line are spaced different distances from the head and are offset from each other;

two corresponding axial grooves on the outside surface of the interior rod; and two circumferential grooves extending from each axial groove and angled toward the interior rod head;

wherein as the interior rod is slid inside the core support, the nubs slide within their respective axial and circumferential grooves to provide a threaded engagement between the interior rod and the core support, to move the head of the interior rod toward the articles and provide an axial compression load onto the core support and the articles to secure the articles in place.

2. The system of claim 1 wherein the two lines of nubs and the two axial grooves are spaced 180° apart on their respective core support and interior rod.

3. The system of claim 1 wherein the perimeters of both the interior rod and the core support are cam shaped, wherein when the interior rod is rotated within the core support the interior rod and core support act as opposing cams with the interior rod radially expanding the core support to tighten against the inside of the articles and to provide a radial expansion force on the articles to secure the articles in place.

4. The system of claim 1 wherein the core support comprises raised portions which extend around the core support and have dimensions selected to permit two articles to share a raised portion when the articles are mounted on the core support.

5. The system of claim 1 further comprising a container in which the core support is mountable, wherein the container comprises a receptacle formed in one wall to receive the core support.

6. The system of claim 5 wherein one support head fits within the receptacle to prevent rotation of the support after the container is closed, and wherein the head comprises four projections equiangularly distributed around the circumference of the head.

7. The system of claim 6 wherein the four projections comprise two opposing large projections which extend for the entire length of the head and two opposing small projections which extend for a short portion of the head length, wherein the receptacle comprises complementary slots which receive the large projections and complementary cavities adjacent the base of the receptacle which receive the small projections, and wherein the receptacle further comprises a ramped recess portion which leads into each cavity, wherein when the projections are received in their respective slots and cavities, the support is secured within the container.

8. The system of claim 7 wherein the container is formed with a double wall construction and wherein when the projections are received in their respective slots and cavities, the inner wall of the dual walls is prevented from bowing outwardly when loads are placed on the support.

9. The system of claim 7 wherein the two axial lines of nubs are aligned with the center of each small projection.

10. The system of claim 1 wherein each article has a channel and wherein the system comprises an elongate retainer extending along the core support wherein the retainer is sized to correspond to the article channel to permit the channel to pass over the retainer and help prevent rotation of the articles on the support.

11. A support for securing a plurality of stacked pancakes, wherein each pancake is mounted on a core and wherein each core has at least one axial channel, wherein the support comprises a head formed on at least one end of the support, wherein the head is polygonal and has a maximum outer diameter which includes at least one corner of the polygon that is greater than the inner diameter of the pancake cores to contact and secure the articles, wherein when one corner aligns with the axial channel on the core the core can be placed over the head and onto the support and wherein after the core is placed on the support, rotation of the head to rotate the corner out of alignment with the axial channel wedges the core onto the support.

12. The support of claim 11 wherein each pancake core has three spaced channels and wherein the head is triangular with each corner aligning respective axial channels when the core is placed onto the support.

13. The support of claim 11 wherein the support is receivable within a container.

* * * * *